United States Patent
Suzaki et al.

(10) Patent No.: US 12,236,083 B2
(45) Date of Patent: Feb. 25, 2025

(54) DATA PROCESSING DEVICE AND DATA PROCESSING METHOD FOR CHANGING SPLIT-SCREEN

(71) Applicant: Faurecia Clarion Electronics Co., Ltd., Saitama (JP)

(72) Inventors: Shuntaro Suzaki, Saitama (JP); Takashi Ishikawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 18/182,994

(22) Filed: Mar. 13, 2023

(65) Prior Publication Data

US 2023/0289057 A1    Sep. 14, 2023

(30) Foreign Application Priority Data

Mar. 14, 2022  (JP) .................................. 2022-038855

(51) Int. Cl.
*G06F 3/04886* (2022.01)
*G06F 3/0486* (2013.01)

(52) U.S. Cl.
CPC ........ *G06F 3/04886* (2013.01); *G06F 3/0486* (2013.01); *G06F 2203/04803* (2013.01)

(58) Field of Classification Search
CPC ............... G06F 3/04886; G06F 3/0486; G06F 2203/04803; G06F 3/0481; G06F 3/04883; B60K 37/00; G09G 5/14; G09G 2354/00

See application file for complete search history.

(56) References Cited

U.S. PATENT DOCUMENTS

| | | | | |
|---|---|---|---|---|
| 5,487,143 | A | * 1/1996 | Southgate | G06F 3/0485 715/792 |
| 5,712,995 | A | * 1/1998 | Cohn | G06F 3/0481 715/792 |
| 2008/0158189 | A1 | 7/2008 | Kim | |
| 2014/0157101 | A1* | 6/2014 | Hogan | G06F 40/177 715/227 |
| 2014/0184547 | A1 | 7/2014 | Tokunaga | |
| 2014/0208262 | A1* | 7/2014 | Huang | G06F 3/0486 715/800 |

(Continued)

FOREIGN PATENT DOCUMENTS

| | | |
|---|---|---|
| EP | 3037938 A1 | 6/2016 |
| JP | 2008-165735 A | 7/2008 |

(Continued)

*Primary Examiner* — Daniel W Parcher
(74) *Attorney, Agent, or Firm* — Volpe Koenig

(57) ABSTRACT

A split screen includes first, second and third split regions, lined up sequentially. The screen generating unit enlarges a size of the first split region and reduces a size of the third split region in response to a drag operation, in the direction of the second split region and the third split region, on a first operable region that is located on a boundary line between the first split region and the second split region. The screen generating unit also enlarges a size of the first split region and reduces a size of the second split region in response to a drag operation, in the direction of the second split region and the third split region, on a second operable region that is different from the first operable region and that is located on the boundary line between the first split region and the second split region.

6 Claims, 12 Drawing Sheets

(56) References Cited

U.S. PATENT DOCUMENTS

| | | | |
|---|---|---|---|
| 2015/0325211 A1 | 11/2015 | Lee et al. | |
| 2016/0202852 A1 | 7/2016 | Park et al. | |
| 2016/0357358 A1* | 12/2016 | Forster | G06F 3/0486 |
| 2021/0319886 A1* | 10/2021 | Day | G06F 3/048 |
| 2022/0050592 A1 | 2/2022 | Ezaki | |

FOREIGN PATENT DOCUMENTS

| | | |
|---|---|---|
| JP | 2014-127184 A | 7/2014 |
| JP | 2020-102084 A | 7/2020 |
| KR | 10-2014-0073399 A | 6/2014 |

* cited by examiner

DATA PROCESSING DEVICE AND DATA PROCESSING METHOD FOR CHANGING SPLIT-SCREEN

FIELD OF INVENTION

The present invention relates to a data processing device and data processing method.

BACKGROUND

Regarding the method for partitioning a screen of a display into a plurality of split regions and displaying different information in each split region, Patent Document 1, for example, discloses a "display controlling device comprising: a split region setting unit for changing dynamically, in response to an operation from a user, a size of a split region that is provided on a screen; a display controlling unit for providing, in the split region, a locating region for locating at least one displayed item, and for changing a relative positioning relationship between locating regions provided in the same split region, in response to a change in size of the split region; and a priority level setting unit for setting a relative priority level between the locating regions provided in the same split region, wherein: the display controlling unit controls, by the locating region unit, display of the displayed items, based on the priority level set for the locating region, when at some of the locating regions overlap due to a change in the relative positional relationships between the locating regions that are provided in the same split region."

PRIOR ART DOCUMENTS

Patent Documents

[Patent Document 1] US20220050592 A1

SUMMARY

In the technology disclosed in Patent Document 1, a screen is partitioned into three split regions by two boundary lines that intersect in a T shape on the screen. The user is able to change dynamically the sizes of the three split regions through moving the point of intersection between the two boundary lines through a drag operation.

However, in the prior art, such as the technology disclosed in Patent Document 1, it is not possible to partition a screen into three or more split regions that are lined up in one direction, nor to change dynamically, through user operations, the sizes of the individual split regions that are partitioned.

The present invention was created in contemplation of such a situation, and the object thereof is to enable a screen to be partitioned into three or more split regions that are lined up in one direction, and to enable the sizes of the split regions to be changed dynamically in response to operations by a user.

Means for Solving the Problem

While the present application includes a plurality of means for solving, at least in part, the problem set forth above, an example thereof includes the following:

In order to solve the problems set forth above, a first aspect of the present invention is a data processing device comprising: a display unit that displays various contents on a screen; an operation receiving unit, that is layered on the display unit and receives operation inputs from a user on the screen; an operation evaluating unit that evaluates an operation by the operation inputs on the operation receiving unit; and a screen generating unit that generates a split screen that includes split regions partitioned by boundary lines, and changes the size of the split regions in the split screen in response to the evaluated operation. The split screen includes a first split region, a second split region, and a third split region, lined up sequentially. The screen generating unit enlarges a size of the first split region and reduces a size of the third split region in response to a drag operation, in the direction of the second split region and the third split region, on a first operable region that is located on a boundary line between the first split region and the second split region (301B). The screen generating unit enlarges a size of the first split region and reduces a size of the second split region in response to a drag operation, in the direction of the second split region and the third split region, on a second operable region that is different from the first operable region and that is located on the boundary line between the first split region and the second split region

Effects of the Invention

According to the present invention, it is enabled to partition the screen into three or more split regions that are lined up in one direction, and change the sizes of the split regions dynamically in response to operations by the user.

Other objects, structures, and effects will become apparent through explanations of embodiments, below.

BRIEF DESCRIPTIONS OF THE DRAWINGS

FORMS FOR CARRYING OUT THE PRESENT INVENTION

One embodiment according to the present invention will be explained below based on the drawings. Note that in all drawings for explaining the embodiment, in principle identical reference symbols will be assigned to identical members, and redundant explanations thereof will be omitted as appropriate. Moreover, in the embodiments below, the structural elements (including elemental steps, and the like), unless explicitly indicated or clearly required in principle, are not absolutely necessary. Moreover, the terms "comprising A," "made from A," "having A," and "including A" do not indicate that other elements are necessarily absent, except for cases wherein it is indicated explicitly that there is only that element. Similarly, in the embodiment below references to shapes, positional relationships, or the like, of the structural elements, or the like, include also elements that approximate or are substantially similar to the shapes, unless explicitly stated or, by principle, one may believe otherwise.

<Example of Structure of Vehicle-Mounted Device 10 According to One Embodiment According to the Present Invention>

A vehicle-mounted device 10 according to one embodiment according to the present invention will be explained below.

Figure 1:
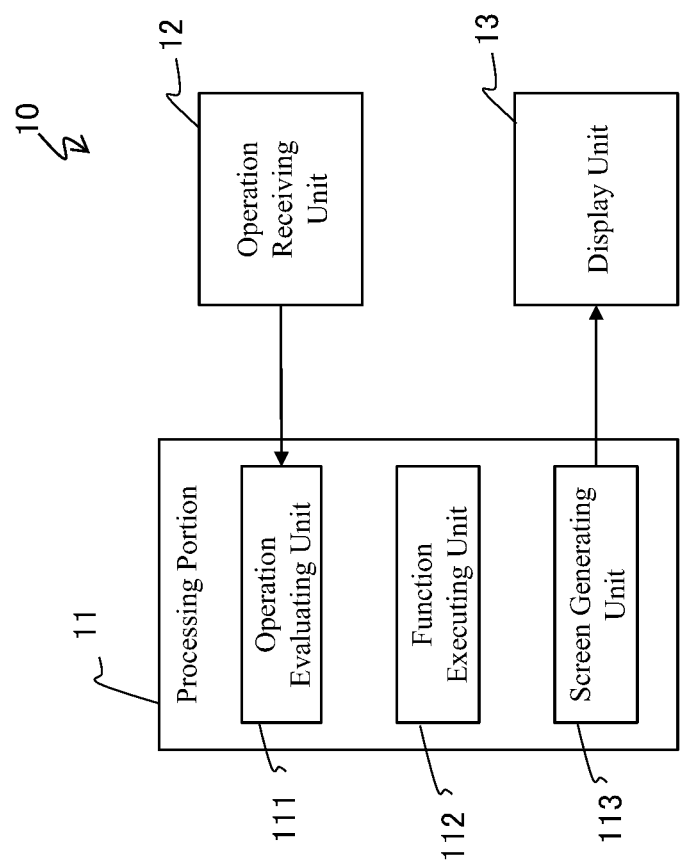
FIG. 1 is a block diagram showing an example configuration of functional blocks of a data processing device according to one embodiment according to the present invention.

FIG. 1 depicts an example configuration of functional blocks of a vehicle-mounted device 10 according to one embodiment according to the present invention. The vehicle-mounted device 10 is an electronic device wherein a touch panel is layered on a display, envisioning operation by a finger during operation. The vehicle-mounted device 10 has, for example, a navigation function, a voice communication function, a music playback function, an air conditioning function, and functions for setting a variety of settings, and the like. The vehicle-mounted device 10 corresponds to the "information processing device" of the present invention.

Figure 2:
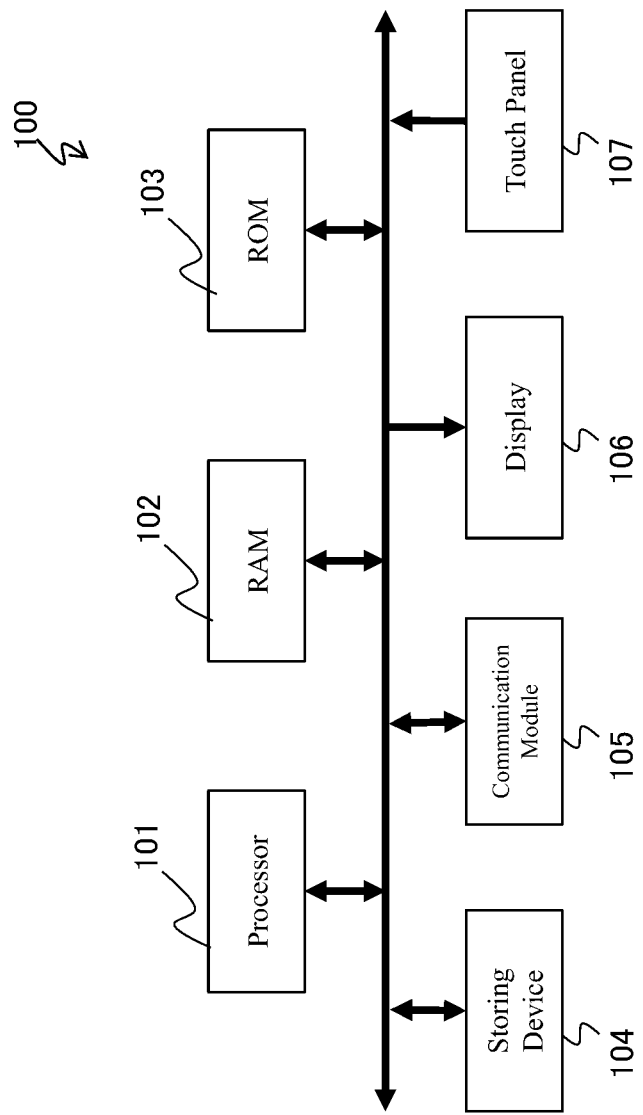
FIG. 2 is a diagram showing an example of a configuration of a computer.

The vehicle-mounted device 10 can be achieved through an ordinary computer. FIG. 2 depicts an example of a configuration of a computer 100 for embodying the vehicle-mounted device 10. The computer 100 is equipped with: a processor 101 such as a CPU (Central Processing Unit), or the like; a RAM (Random Access Memory) 102 for storing programs and data temporarily; a storing device 104, such as a ROM (Read-Only Memory), an HDD (Hard Disk Drive) or an SSD, a non-volatile memory card, or the like, for storing a boot program, or the like, to be run by the processor 101; a communication module 105 for carrying out communication through connecting to a network such as the Internet; a display 106 that is wide in the horizontal direction, made from, for example, a liquid crystal display, an organic EL (Electro-Luminescence) panel, or the like; and a touch panel 107 that is layered on the display 106.

As shown in FIG. 1, the vehicle-mounted device 10 is provided with a processing unit 11, an operation receiving unit 12, and a display unit 13. The processing unit 11 has various functional blocks of an operation evaluating unit 111, a function executing unit 112, and a screen generating unit 113.

The processing unit 11 is made from the processor 101 of the computer 100, where the operation evaluating unit 111, function executing unit 112, and screen generating unit 113 are achieved through execution of a prescribed program by the processor 101.

The operation evaluating unit 111 evaluates the detail of an operation from a user, based on an operation signal from the operation receiving unit 12. The function executing unit 112 executes processes in various types of functions, such as a navigation function, a voice communication function, a music playback function, an air conditioning function, functions for setting various types of settings, and the like, in response to specifics of an operation by a user. The screen generating unit 113 generates, and displays on the display unit 13, various types of screens based on processing by the function executing unit 112 and on results of evaluations of user operations by the operation evaluating unit 111.

The operation receiving unit 12 is made from the touch panel 107 of the computer 100, and outputs, to the operation evaluating unit 111 of the processing unit 11, an operation signal corresponding to an operation by a user (a drag operation, a touch operation, or the like). The display unit 13 is made from the display 106 of the computer 100, and displays various types of screens under control of the screen generating unit 113.

Note that each of the structural elements shown in FIG. 1 is partitioned depending on the primary processing detail thereof, for ease in understanding the functions of the vehicle-mounted device 10 that is achieved in the present embodiment. Consequently, the present invention is not limited to the ways in which the individual structural elements are partitioned, nor by the names applied thereto. Additionally, each of the individual functional blocks of the vehicle-mounted device 10 may be partitioned into a greater number of functional blocks depending on the details of processing. Moreover, the partitioning may be such that more processes are carried out by a single functional block.

All or part of each functional block may be structured through hardware that is mounted into a computer (that is, through an integrated circuit known as an ASIC). The processes in each individual functional block may be executed by a single hardware element, or executed by a plurality of hardware elements.

<Drag Operations in a Split Screen>

The handling of drag operations in a split screen 300 (FIG. 3) that is displayed on the display unit 13 of the vehicle-mounted device 10 will be explained next.

<First Display Example of the Split Screen 300>

Figure 3:
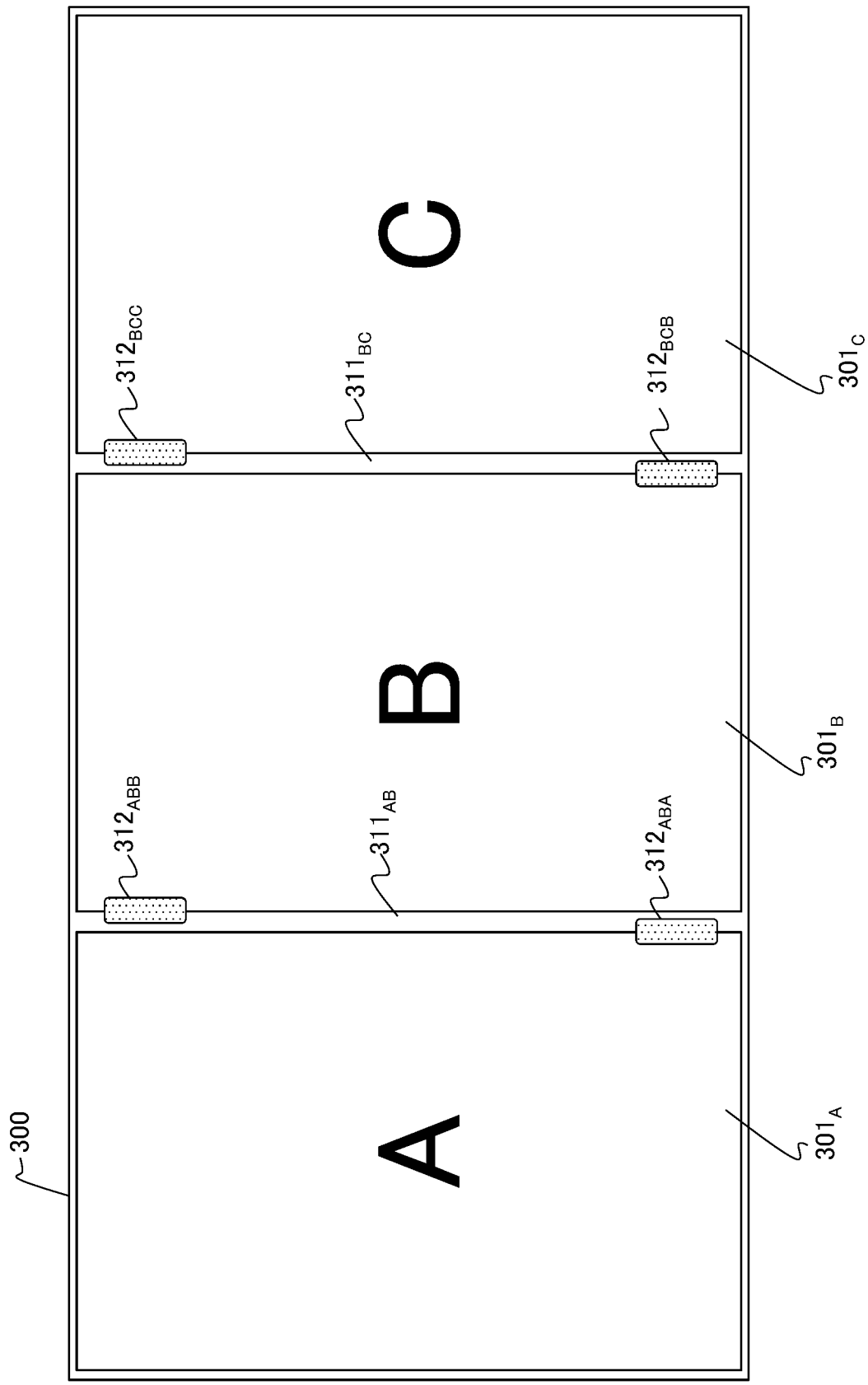
FIG. 3 is a diagram showing an example of a first display of a split screen.

FIG. 3 depicts a first display example of a split screen 300. FIG. 4A through FIG. 7B are diagrams diagram for explaining a drag operation on the first display example of a split screen 300.

The split screen 300 is displayed on a display region of the display unit 13. The split screen 300 is partitioned into no less than three split regions, lined up in one direction, by a plurality of parallel boundary lines. Each split region displays information corresponding to a different function (a navigation function, a voice communication function, a music playback function, an air conditioning function, functions for setting various types of settings, and the like). Note that the plurality of boundary lines for partitioning the display region of the display unit 13 into split regions need not necessarily be strictly parallel.

In FIG. 3, the split screen 300 is partitioned into three split regions $301_A$, $301_B$, and $301_C$ lined up sequentially in one direction, by two parallel boundary lines $311_{AB}$ and $311_{BC}$. Note that while in this example the split regions $301_A$, $301_B$, and $301_C$ are lined up sequentially from the left to the right in the split screen 300, they may instead be lined up in the opposite direction, from the right to the left of the split screen 300.

In the first display example, two operable regions $312_{ABA}$ and $312_{ABC}$, indicating positions that are operable by the user, are provided on the boundary line $311_{AB}$ between the split region $301_A$ and the split region $301_B$. The operable region $312_{ABA}$ is provided at a position that is biased toward the split region $301_A$ side on the boundary line $311_{AB}$. The operable region $312_{ABB}$ is provided at a position that is biased toward the split region $301_B$ side on the boundary line $311_{AB}$.

Similarly, two operable regions $312_{BCB}$ and $312_{BCC}$, indicating positions that are operable by the user, are provided on the boundary line $311_{BC}$ between the split region $301_B$ and the split region $301_C$. The operable region $312_{BCB}$ is provided at a position that is biased toward the split region $301_B$ side on the boundary line $311_{BC}$. The operable region $312_{BCC}$ is provided at a position that is biased toward the split region $301_C$ side on the boundary line $311_{BC}$.

The split regions $301_A$, $301_B$, and $301_C$ correspond to the first split region, second split region, and third split region in the present invention. The operable regions to $312_{ABA}$, $312_{ABB}$, $312_{BCB}$, and $312_{BCC}$ correspond to the first operable region, the second operable region, the third operable region, and the fourth operable region in the present invention.

In the below, the split regions $301_A$, $301_B$, and $301_C$ may be termed, respectively, split regions A, B, and C. The split regions $301_A$, $301_B$, and $301_C$ may be referred to together simply as split regions 301 when there is no need to distinguish between them individually. The boundary lines $311_{AB}$ and $311_{BC}$ may be termed respectively boundary lines AB and BC. The boundary lines $311_{AB}$, and 311 BC may be referred to together simply as boundary lines 311 when there is no need to distinguish between them individually. The operable regions $312_{ABA}$, $312_{ABB}$, $312_{BCB}$, and $312_{BCC}$ may be termed operable regions ABA, ABB, BCB, and BCC. The operable regions $312_{ABA}$, $312_{ABB}$, $312_{BCB}$, and $312_{BCC}$ may be referred to together simply as simply operable regions 312 when there is no need to distinguish between them individually.

The user is able to change a size of a split region 301 dynamically through moving a boundary line 311 in the horizontal direction by performing a drag operation in the horizontal direction on an operable region 312 on the boundary line 311.

The dynamic size change of a split region 301 in response to a drag operation on the operable region 312 will be explained in detail below.

Figure 4A:
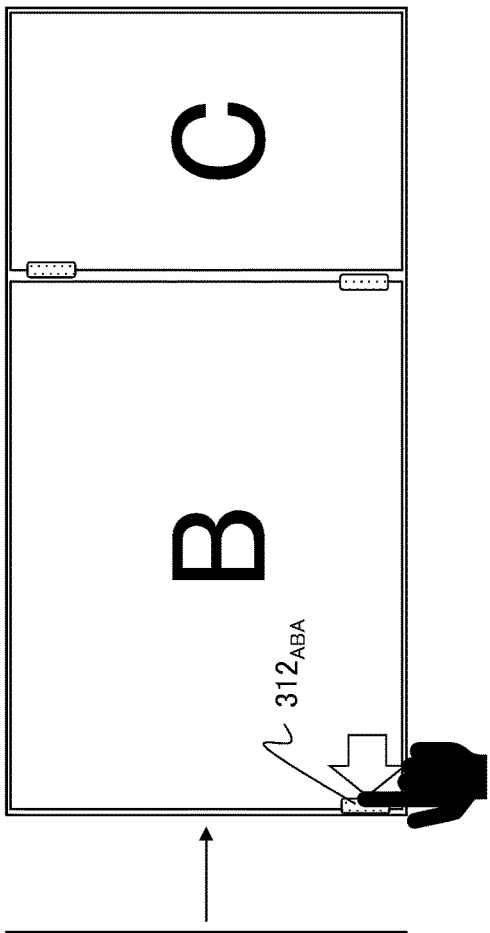
FIG. 4A is a diagram for explaining an example of a drag operation on the first display example of a split screen.
Figure 4A:
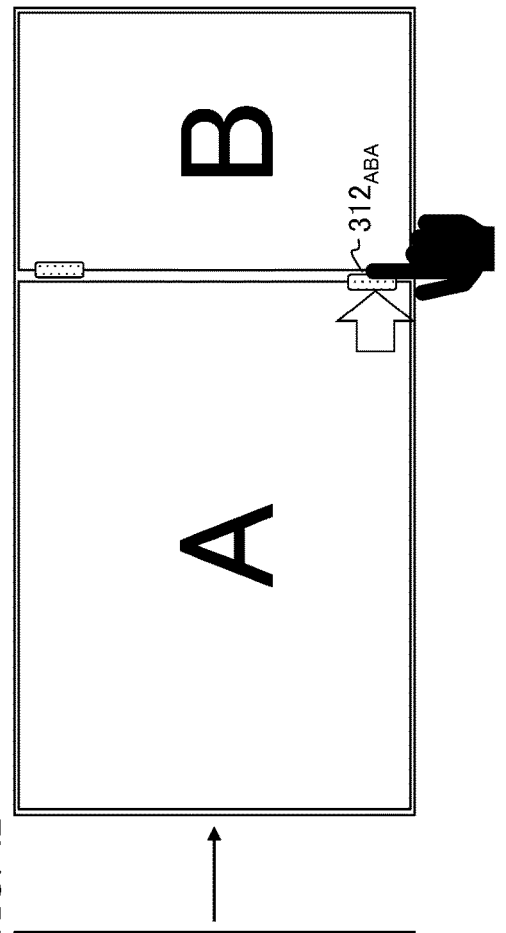

As shown FIG. 4A, when the user performs a drag operation toward the left on the operable region ABA that is located on the boundary line AB, biased slightly toward the split region A side, the boundary line AB is moved toward the left. As a result, the size of the split region A is reduced, the size of the split region B is enlarged, and the size of the split region C is maintained. Additionally, the split region A will be deleted if the drag operation by the user reaches the left edge of the split screen 300.

Figure 4B:
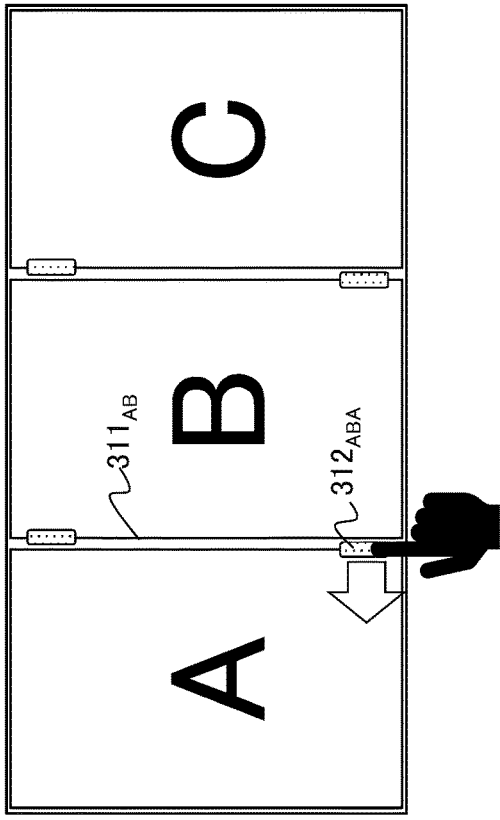
FIG. 4B is a diagram for explaining an example of a drag operation on the first display example of a split screen.
Figure 4B:
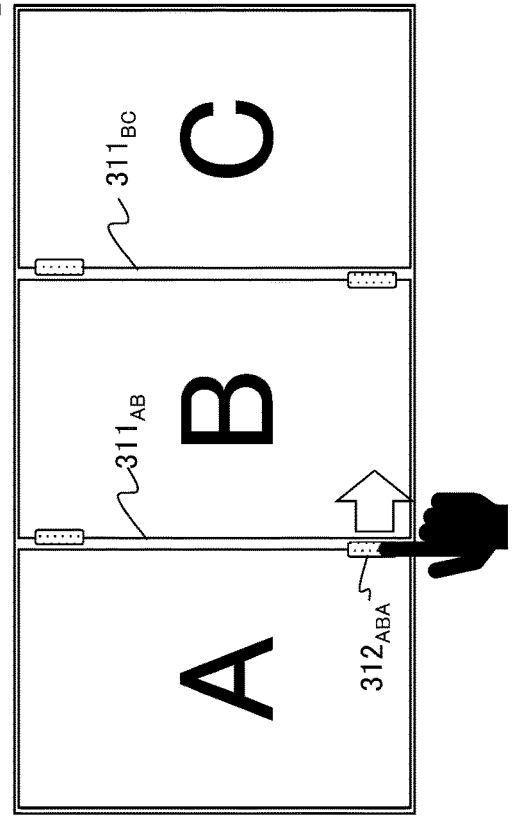

As shown FIG. 4B, when the user performs a drag operation toward the right on the operable region ABA that is located on the boundary line AB, biased slightly toward the split region A side, the boundary lines AB and BC are moved toward the left. As a result, the size of the split region A is enlarged, the split region B is moved to the right while maintaining the size thereof, and the size of the split region C is reduced. Additionally, the split region C will be deleted if the drag operation by the user reaches the original position of the boundary line BC.

Figure 5A:
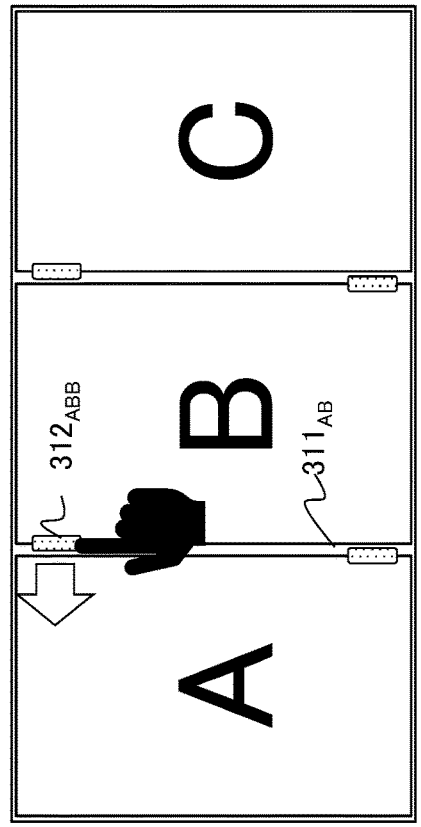
FIG. 5A is a diagram for explaining an example of a drag operation on the first display example of a split screen.
Figure 5A:
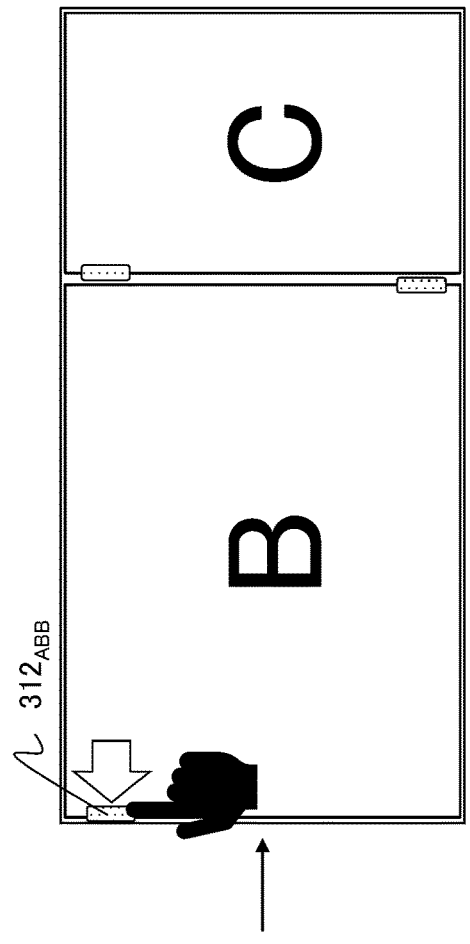

As shown FIG. 5A, when the user performs a drag operation toward the left on the operable region ABB that is located on the boundary line AB, biased slightly toward the split region B side, the boundary line AB is moved toward the left. As a result, the size of the split region A is reduced, the size of the split region B is enlarged, and the size of the split region C is maintained. Additionally, the split region A will be deleted if the drag operation by the user reaches the left edge of the split screen 300.

Figure 5B:
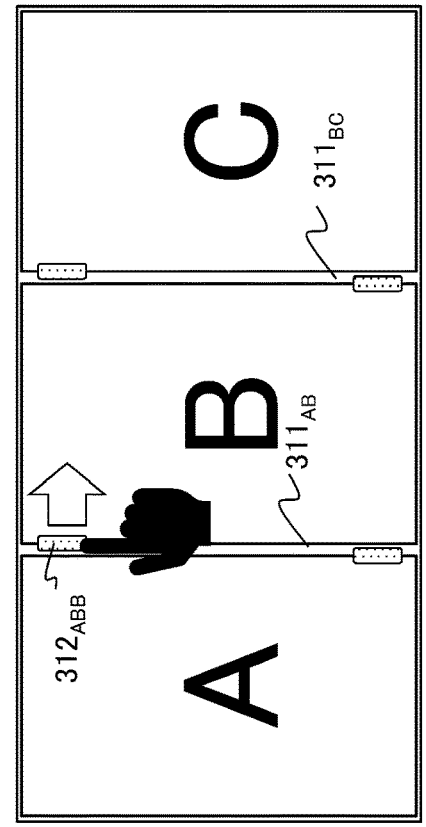
FIG. 5B is a diagram for explaining an example of a drag operation on the first display example of a split screen.
Figure 5B:
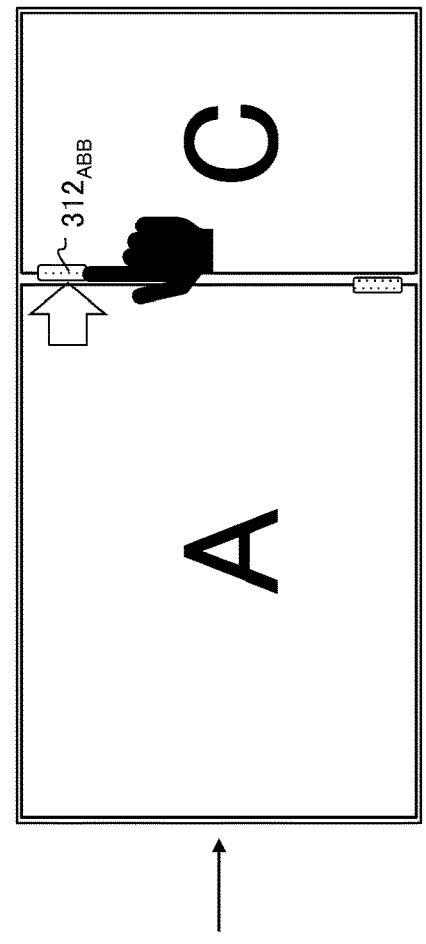

As shown FIG. 5B, when the user performs a drag operation toward the right on the operable region ABB that is located on the boundary line AB, biased slightly toward the split region B side, the boundary line AB is moved toward the right. As a result, the size of the split region A is enlarged, the size of the split region B is reduced, and the size of the split region C is maintained. Additionally, the split region B will be deleted if the drag operation by the user reaches the original position of the boundary line BC.

Figure 6A:
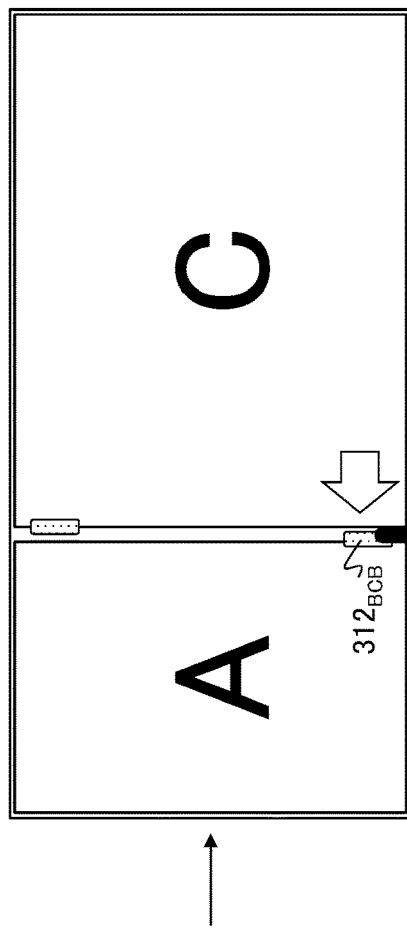
FIG. 6A is a diagram for explaining an example of a drag operation on the first display example of a split screen.
Figure 6A:
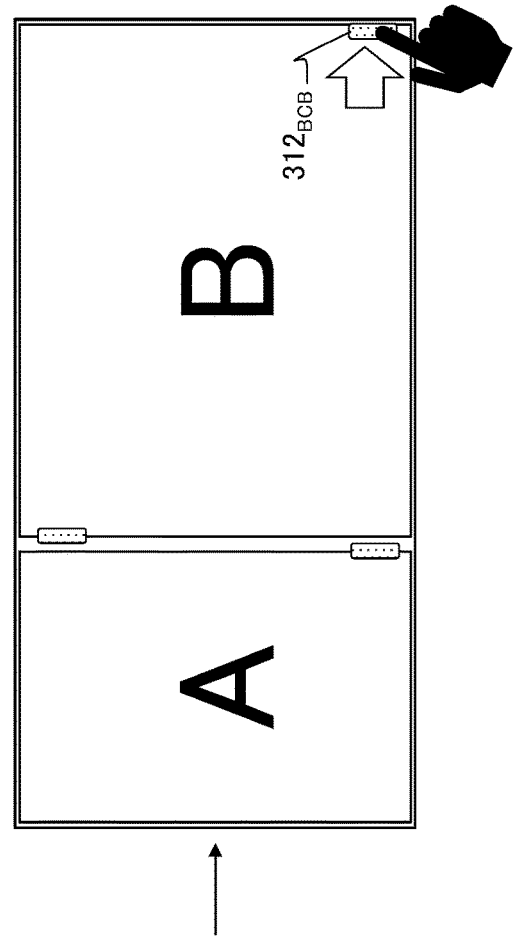

As shown FIG. 6A, when the user performs a drag operation toward the left on the operable region BCB that is located on the boundary line BC, biased slightly toward the split region B side, the boundary line BC is moved toward the left. As a result, the size of the split region A is maintained, the size of the split region B is reduced, and the size of the split region C is enlarged. Additionally, the split region B will be deleted if the drag operation by the user reaches the original position of the boundary line AB.

Figure 6B:
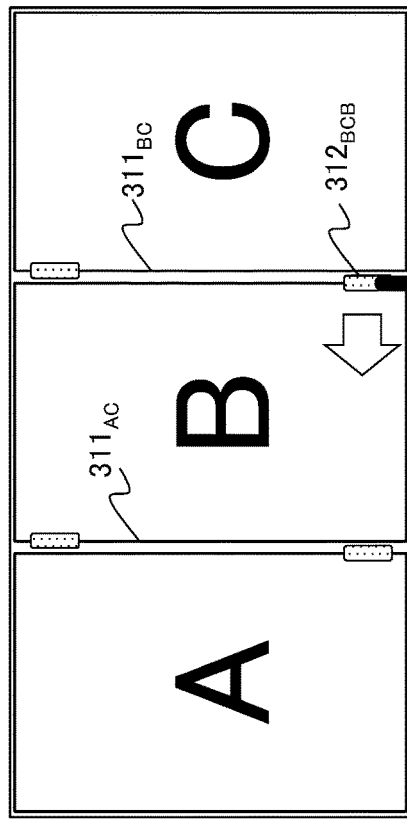
FIG. 6B is a diagram for explaining an example of a drag operation on the first display example of a split screen.
Figure 6B:
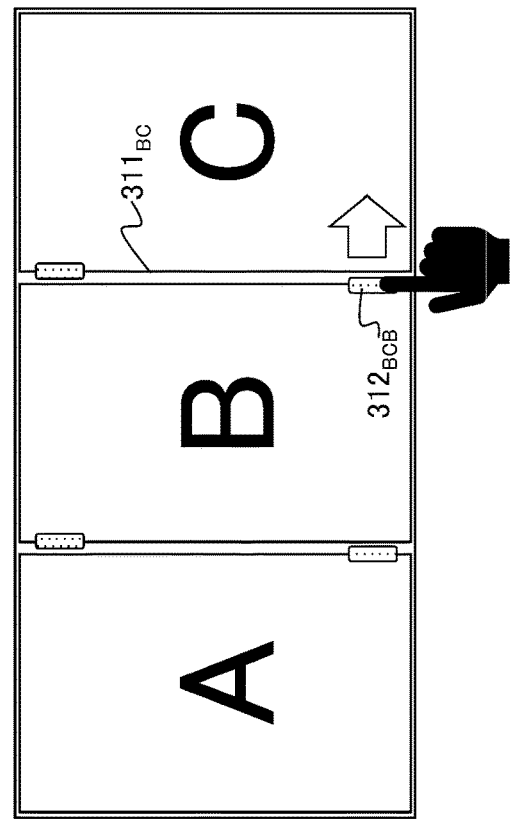

As shown FIG. 6B, when the user performs a drag operation toward the right on the operable region BCB that is located on the boundary line BC, biased slightly toward the split region B side, the boundary line BC is moved toward the right. As a result, the size of the split region A is maintained, the size of the split region B is enlarged, and the size of the split region C is reduced. Additionally, the split region C will be deleted if the drag operation by the user reaches the right edge of the split screen 300.

Figure 7A:
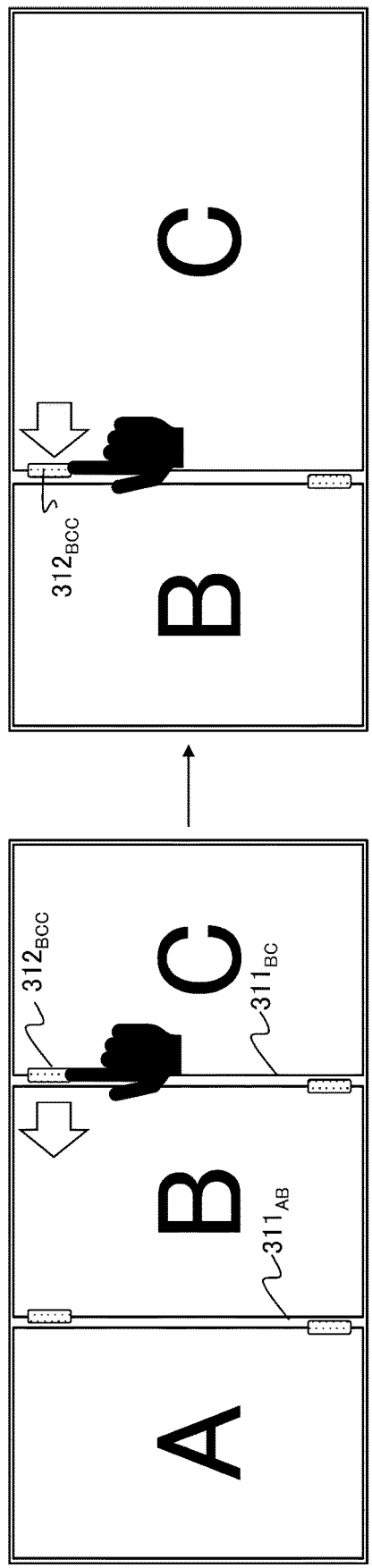
FIG. 7A is a diagram for explaining an example of a drag operation on the first display example of a split screen.

As shown FIG. 7A, when the user performs a drag operation toward the left on the operable region BCC that is located on the boundary line BC, biased slightly toward the split region C side, the boundary lines AB and BC are moved toward the left. As a result, the size of the split region A is reduced, the split region B is moved to the left while maintaining the size thereof, and the size of the split region C is enlarged. Additionally, the split region A will be deleted if the drag operation by the user reaches the original position of the boundary line AB.

Figure 7B:
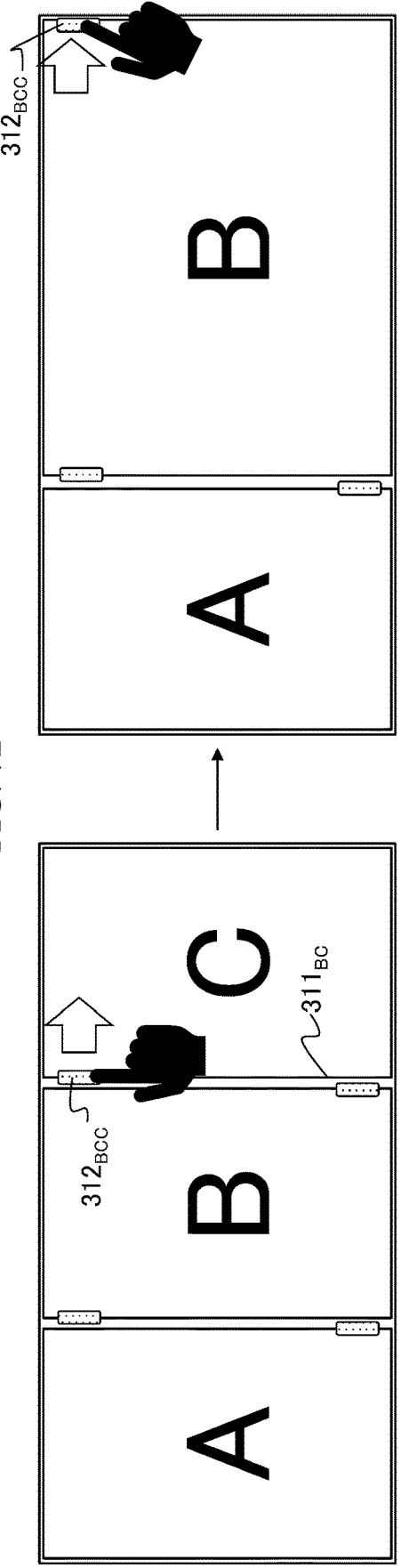
FIG. 7B is a diagram for explaining an example of a drag operation on the first display example of a split screen.

As shown at FIG. 7B, when the user performs a drag operation toward the right on the operable region BCC that is located on the boundary line BC, biased slightly toward the split region C side, the boundary line BC is moved toward the right, the same as at FIG. 7A. As a result, the size of the split region A is maintained, the size of the split region B is enlarged, and the size of the split region C is reduced. Additionally, the split region C will be deleted if the drag operation by the user reaches the right edge of the split screen 300.

Note that the operable region ABA need not necessarily be displayed. The configuration may be such that the same operation will be executed when a drag operation is performed on the operable region ABA, described above, with an operable region ABA wherein the left side of the boundary line AB (the right end of the split region A) is not displayed. The operable region ABB need not necessarily be displayed. The configuration may be such that the same operation will be executed when a drag operation is performed on the operable region ABB, described above, with an operable region ABB wherein the right side of the boundary line AB (the left end of the split region B) is not displayed. The same is true for the operable regions BCB and BCC.

<Display Controlling Process on the First Display Example of the Split Screen 300>

Figure 8:
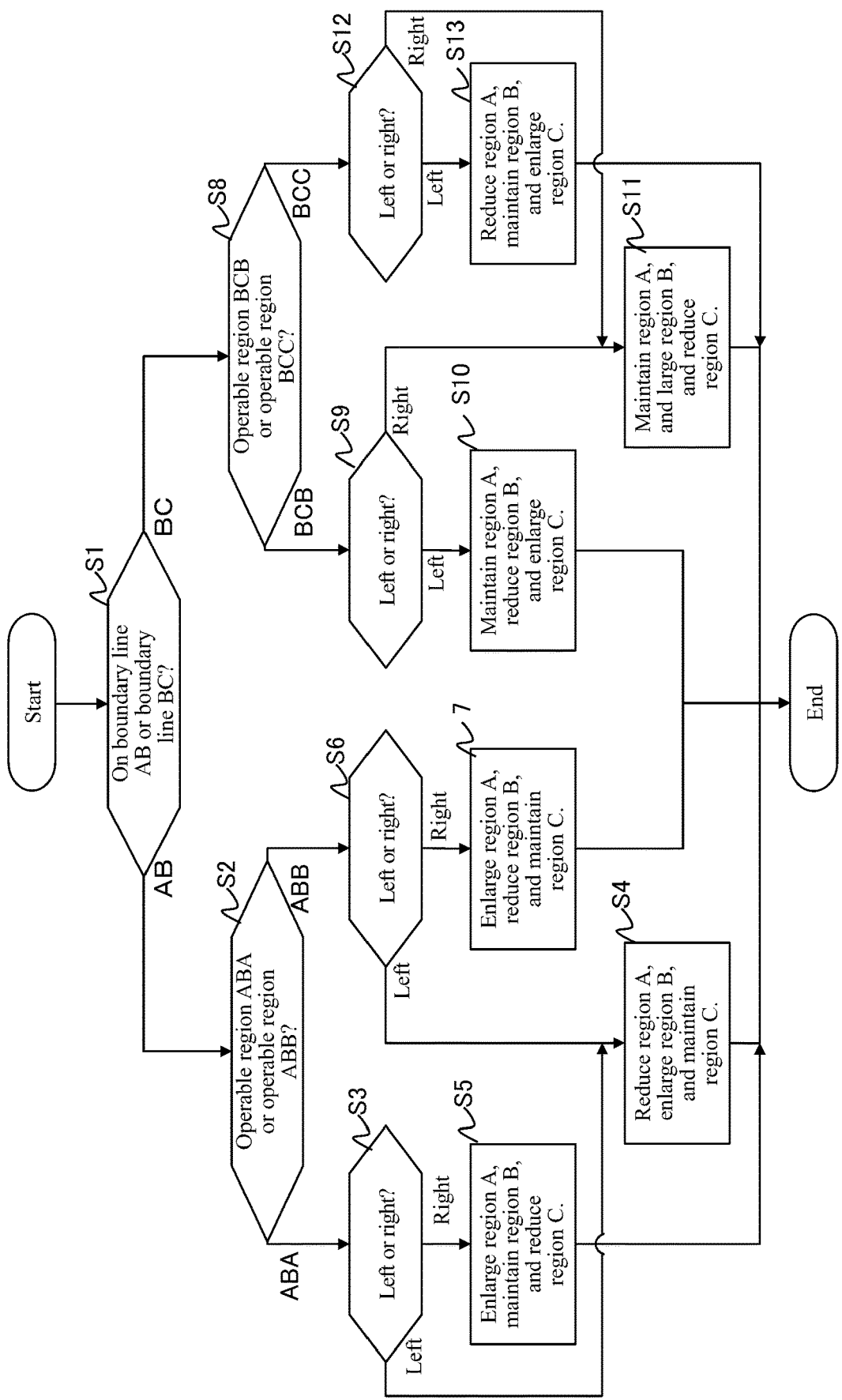
FIG. 8 is a flowchart for explaining an example of a display controlling process.

FIG. 8 is a flowchart for explaining an example of a display controlling process for the first display example of the split screen 300.

This display controlling process is executed each time the user performs a drag operation on the operable region 312 of the split screen 300 that is displayed on the display unit 13.

First the operation evaluating unit 111 evaluates whether the operable region 312 that has been dragged by the user is on the boundary line AB or the boundary line BC (Step S1).

In Step S1, if the evaluation is that the operable region 312 that has been a dragged is evaluated as being on the boundary line AB, the operation evaluating unit 111 then evaluates whether the operable region 312 is the operable region ABA that is biased toward the split region A side, or the operable region ABB that is biased toward the split region B side (Step S2).

If the evaluation in Step S2 is that the operable region 312 is the operable region ABA, the operation evaluating unit 111 then evaluates whether the drag operation is to the left or to the right (Step S3).

If the evaluation in Step S3 is that the drag operation is to the left (corresponding to FIG. 4A), the screen generating unit 113 then reduces the size of the split region A, enlarges the size of the split region B, and maintains the size of the split region C by moving the boundary line AB toward the left commensurate with the amount of movement of the drag operation (Step S4).

On the other hand, if the evaluation in Step S3 was that the drag operation was toward the right (corresponding to FIG. 4B), the screen generating unit 113 then enlarges the size of the split region A, maintains the size of the split region B, and reduces the size of the split region C through moving both the boundary lines AB and BC synchronously toward the right, commensurate with the amount of movement of the drag operation (Step S5).

If the evaluation in Step S2 is that the operable region 312 is the operable region ABB, the operation evaluating unit 111 then evaluates whether the drag operation is to the left or to the right (Step S6).

If the evaluation in Step S6 is that the drag operation is to the left (corresponding to FIG. 5A), the procedure in Step S4 is performed, the same as if the evaluation in Step S3 is that the drag operation is to the left.

On the other hand, if the evaluation in Step S6 was that the drag operation was toward the right (corresponding to FIG. 5B), the screen generating unit 113 then enlarges the size of the split region A, reduces the size of the split region B, and maintains the size of the split region C through moving both the boundary line AB toward the right, commensurate with the amount of movement of the drag operation (Step S7).

In Step S1, if the evaluation is that the operable region 312 that has been a dragged is evaluated as being on the boundary line BC, the operation evaluating unit 111 then evaluates whether the operable region 312 is the operable region BCB that is biased toward the split region B side, or the operable region BCC that is biased toward the split region C side (Step S8).

If the evaluation in Step S8 is that the operable region 312 is the operable region BCB, the operation evaluating unit 111 then evaluates whether the drag operation is to the left or to the right (Step S9).

If the evaluation in Step S9 is that the drag operation is to the left (corresponding to FIG. 6A), the screen generating unit 113 then maintains the size of the split region A, reduces the size of the split region B, and enlarges the size of the split region C by moving the boundary line BC toward the left commensurate with the amount of movement of the drag operation (Step S10).

On the other hand, if the evaluation in Step S9 was that the drag operation was toward the right (corresponding to FIG. 6B), the screen generating unit 113 then maintains the size of the split region A, enlarges the size of the split region B, and reduces the size of the split region C through moving both the boundary line BC toward the right, commensurate with the amount of movement of the drag operation (Step S11).

If the evaluation in Step S8 is that the operable region 312 is the operable region BCC, the operation evaluating unit 111 then evaluates whether the drag operation is to the left or to the right (Step S12).

If the evaluation in Step S12 is that the drag operation is to the left (corresponding to FIG. 7A), the screen generating unit 113 then reduces the size of the split region A, maintains the size of the split region B, and enlarges the size of the split region C by moving the boundary lines AB and BC toward the left commensurate with the amount of movement of the drag operation (Step S13).

On the other hand, if the evaluation in Step S12 is that the drag operation is to the right (corresponding to FIG. 7B), the procedure in Step S11 is performed, the same as if the evaluation in Step S9 is that the drag operation is to the right.

The display controlling process for the first display example of the split screen 300, explained above, enables the user to change dynamically the sizes of the split regions 301, for his or her own convenience, through a drag operation on an operable region 312 on a boundary line 311. Moreover, different display control in relation to changing the sizes of the split regions 301 is carried out depending on which of the two operable regions 312 that are provided on the same boundary line 311 that is dragged by the user.

Note that, in addition to the above, in the display controlling process set forth above, the same process (Step S4) is carried out when "left" in Step S3 and when "left" in Step S6. Moreover, the same process (Step S11) is carried out when "right" in Step S9 and when "right" in Step S12.

Note that, instead, different processes may be carried out when "left" in Step S3 and "left" in Step S6. Similarly, different processes may be carried out when "right" in Step S9 and "right" in Step S12.

<Modified Example of Display Controlling Process on the First Display Example of the Split Screen>

Figure 9:
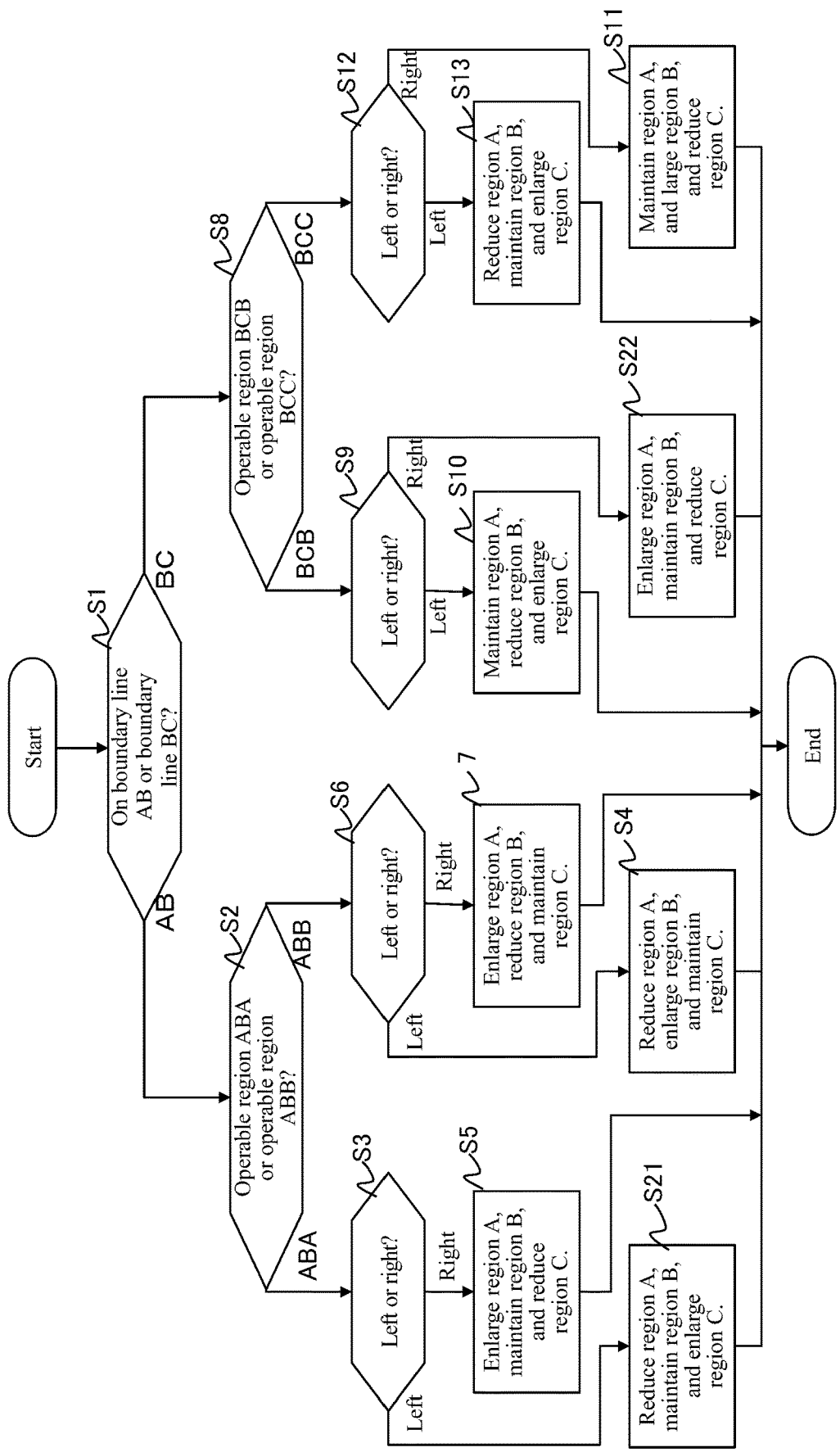
FIG. 9 is a flowchart for explaining a modified example of a display controlling process.
Figure 10A:
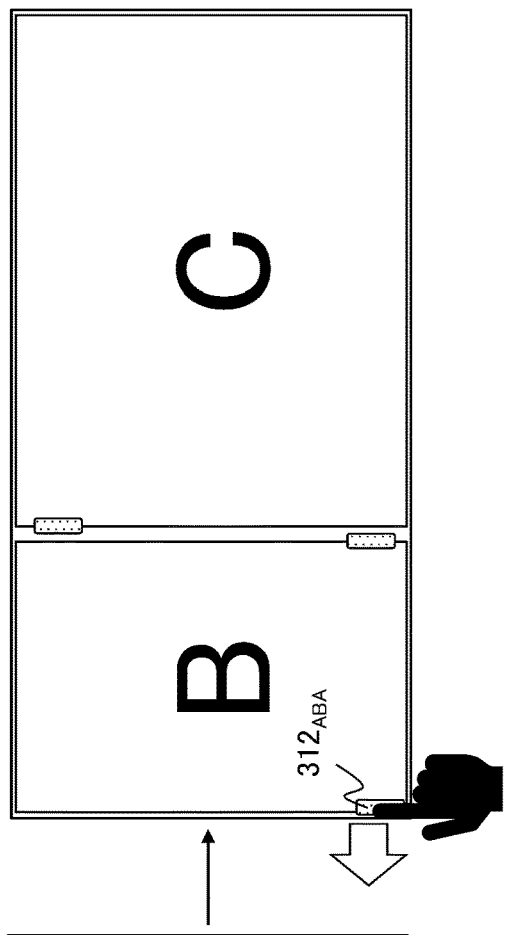
FIG. 10A is a diagram for explaining a modified example of a drag operation on the first display example of a split screen.
Figure 10A:
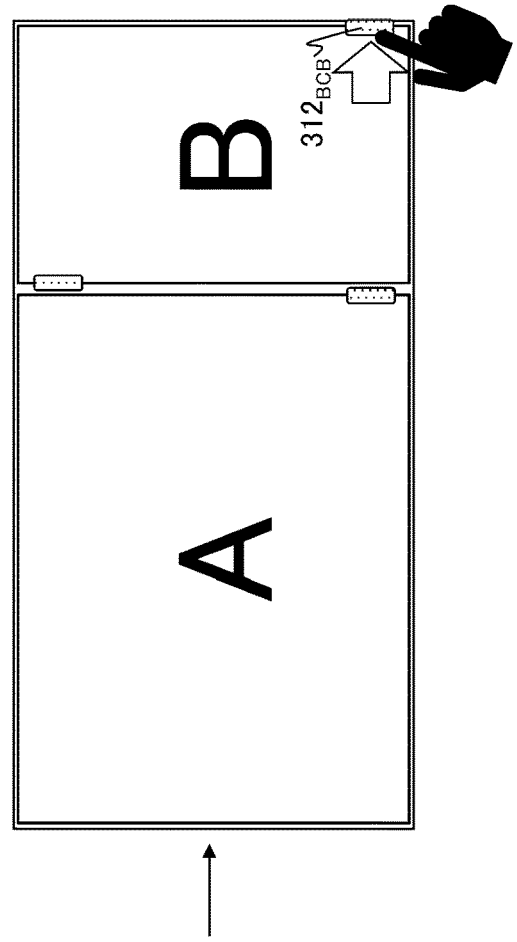
Figure 10B:
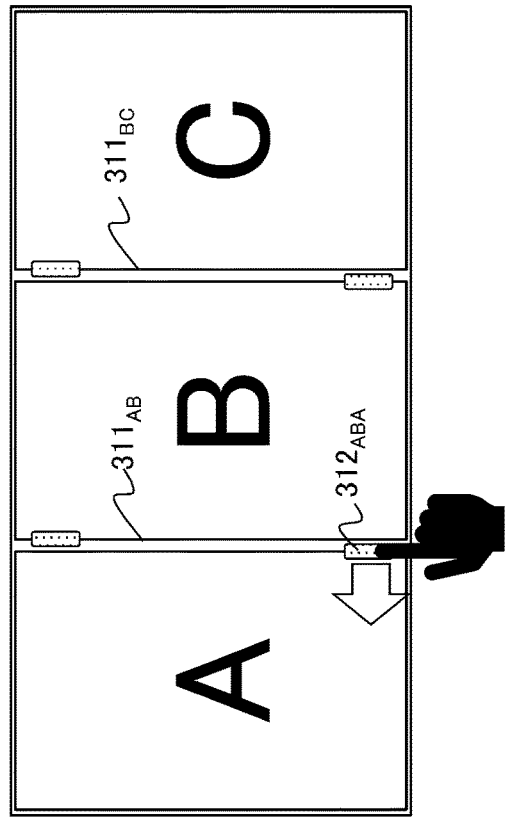
FIG. 10B is a diagram for explaining a modified example of a drag operation on the first display example of a split screen.
Figure 10B:
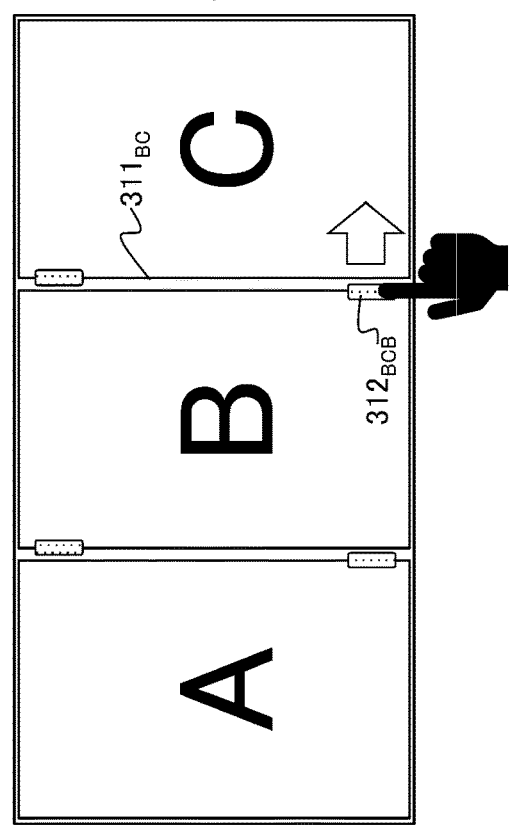

FIG. 9 is a flowchart for explaining a modified example of a display controlling process for the first display example of the split screen 300. FIG. 10A and FIG. 10B are diagrams for explaining the modified example.

In the modified example, a point of difference from the display controlling process shown in FIG. 8 is that the process of Step S21 is executed upon evaluation, in Step S3, that the drag operation on the operable region ABA is toward the left. A point of difference from the display controlling process shown in FIG. 8 is that the process of Step S22 is executed upon evaluation, in Step S9, that the drag operation on the operable region BCB is toward the right. The processes in the other steps, Step S1 through S13, are the same as for the display controlling process shown in FIG. 8, and explanations thereof will be omitted.

When, in this modified example, the evaluation in Step S3 is that the drag operation on the operable region ABA is toward the left, the operation thereafter will be as shown at FIG. 10A (Step S21). Specifically, the screen generating unit 113 moves the boundary lines AB and BC toward the left commensurate with the amount of movement of the drag operation by the user. The result is that the size of the split region A will be reduced (or ultimately deleted), the size of the split region B will be maintained, and the size of the split region C will be enlarged.

Additionally, if the evaluation in Step S9 is that the drag operation on the operable region BCB is toward the right, the operation thereafter will be as shown at FIG. 10B (Step S22). Specifically, the screen generating unit 113 moves the boundary lines AB and BC simultaneously toward the left commensurate with the amount of movement of the drag operation by the user. The result is that the size of the split region A will be enlarged, the size of the split region B will be maintained, and the size of the split region C will be reduced (or ultimately deleted).

In the modified example, described above, without exception different display control in relation to changing the sizes of the split regions 301 is carried out depending on which of the two operable regions 312 that are provided on the same boundary line 311 that is dragged.

<Second Display Example of the Split Screen 300>

Figure 11:
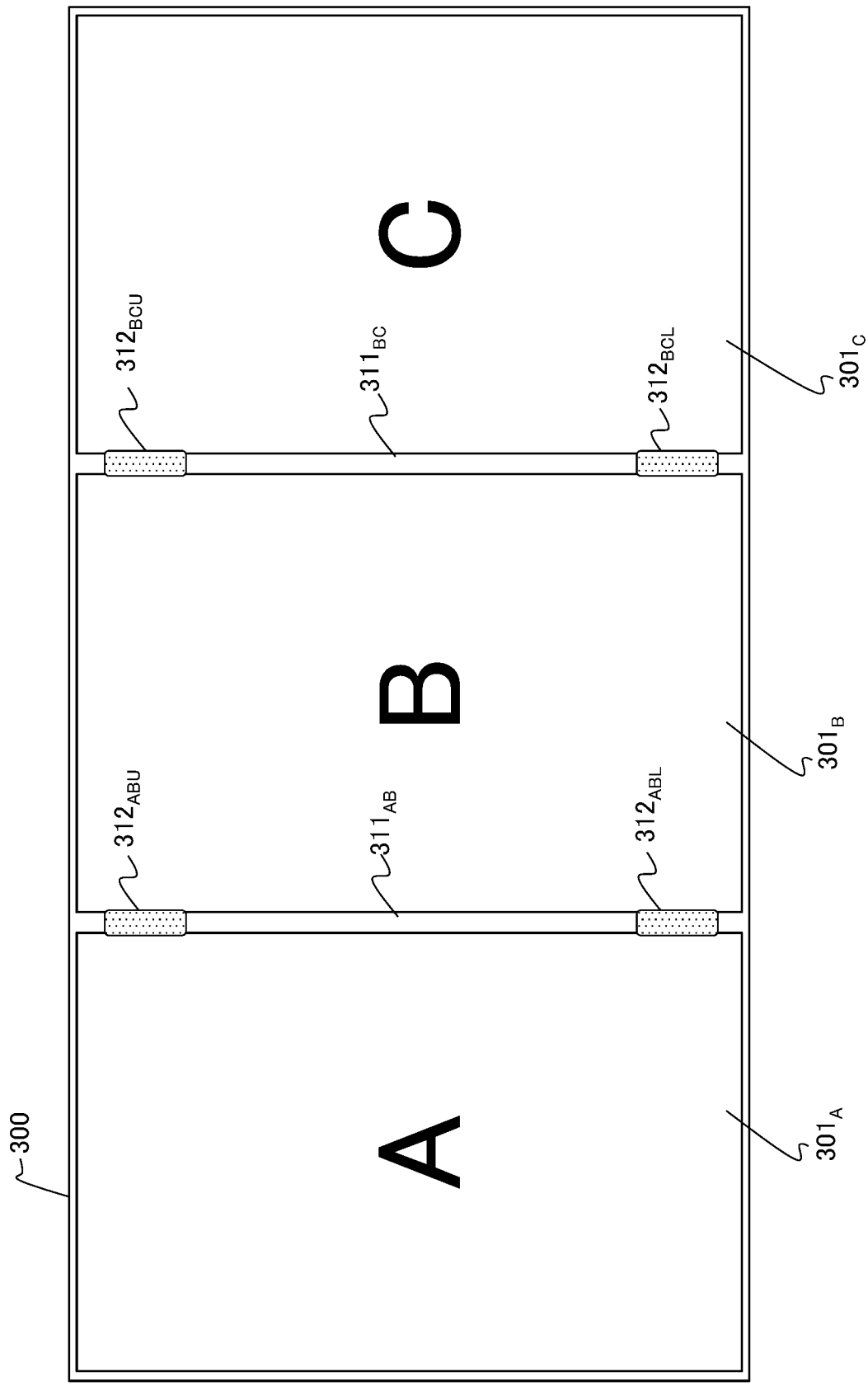
FIG. 11 is a diagram showing an example of a second display of a split screen.

FIG. 11 depicts a second display example of a split screen 300.

In the second display example, two operable regions $312_{ABU}$ and $312_{ABL}$, indicating positions that are operable by the user, are provided on the boundary line AB between the split region A and the split region B. The operable region $312_{ABU}$ is provided at a position that is biased toward the top side of the boundary line AB between the split regions A and B. The operable region $312_{ABL}$ is provided at a position that is biased toward the bottom side of the boundary line $311_{AB}$ between the split regions A and B.

Similarly, two operable regions $312_{BCU}$ and $312_{BCL}$, indicating positions that are operable by the user, are provided on the boundary line BC between the split region B and the split region C. The operable region $312_{BCU}$ is provided at a position that is biased toward the top side of the boundary line BC between the split regions B and C. The operable region $312_{BCL}$ is provided at a position that is biased toward the bottom side of the boundary line BC between the split regions B and C.

In the below the operable regions $312_{ABU}$, $312_{ABL}$, $312_{BCU}$, and $312_{BCL}$ may be termed operable regions ABU, ABL, BCU, and BCL. The operable regions $312_{ABU}$, $312_{ABL}$, $312_{BCU}$, and $312_{BCL}$ may be referred to together simply as simply operable regions 312 when there is no need to distinguish between them individually.

As with the case of the first display example (FIG. 3), in the second display example the boundary line 311 can be moved to the left or the right through performing a drag operation to the left or the right on the operable region 312 that is on the boundary line 311. This enables the user to change the sizes of the split regions 301 dynamically.

Specifically, the operable regions ABB, ABA, BCC, and BCB in the flowchart (FIG. 8) for explaining an example of the display controlling process in relation to the first display example for the split screen 300, and in the flowchart (FIG. 9) for explaining the modified example, may be read instead as the operable regions ABU, ABL, BCU, and BCL in the second display example. The operable regions ABB, ABA, BCC, and BCB may be read instead as the operable regions ABL, ABU, BCL, and BCU in the second display example.

Note that the operable region ABU need not necessarily be displayed. The configuration may be such that the same operation will be executed when a drag operation is performed on the operable region ABU, described above, with an operable region ABA wherein one side of the boundary line AB (the top side, in the case in the figure) is not displayed. The operable region ABL need not necessarily be displayed. The configuration may be such that the same operation will be executed when a drag operation is performed on the operable region ABL, described above, with an operable region ABB wherein the other side of the boundary line AB (the bottom side, in the case in the figure) is not displayed. The same is true for the operable regions BCU and BCL.

<Third Display Example of the Split Screen 300>

Figure 12:
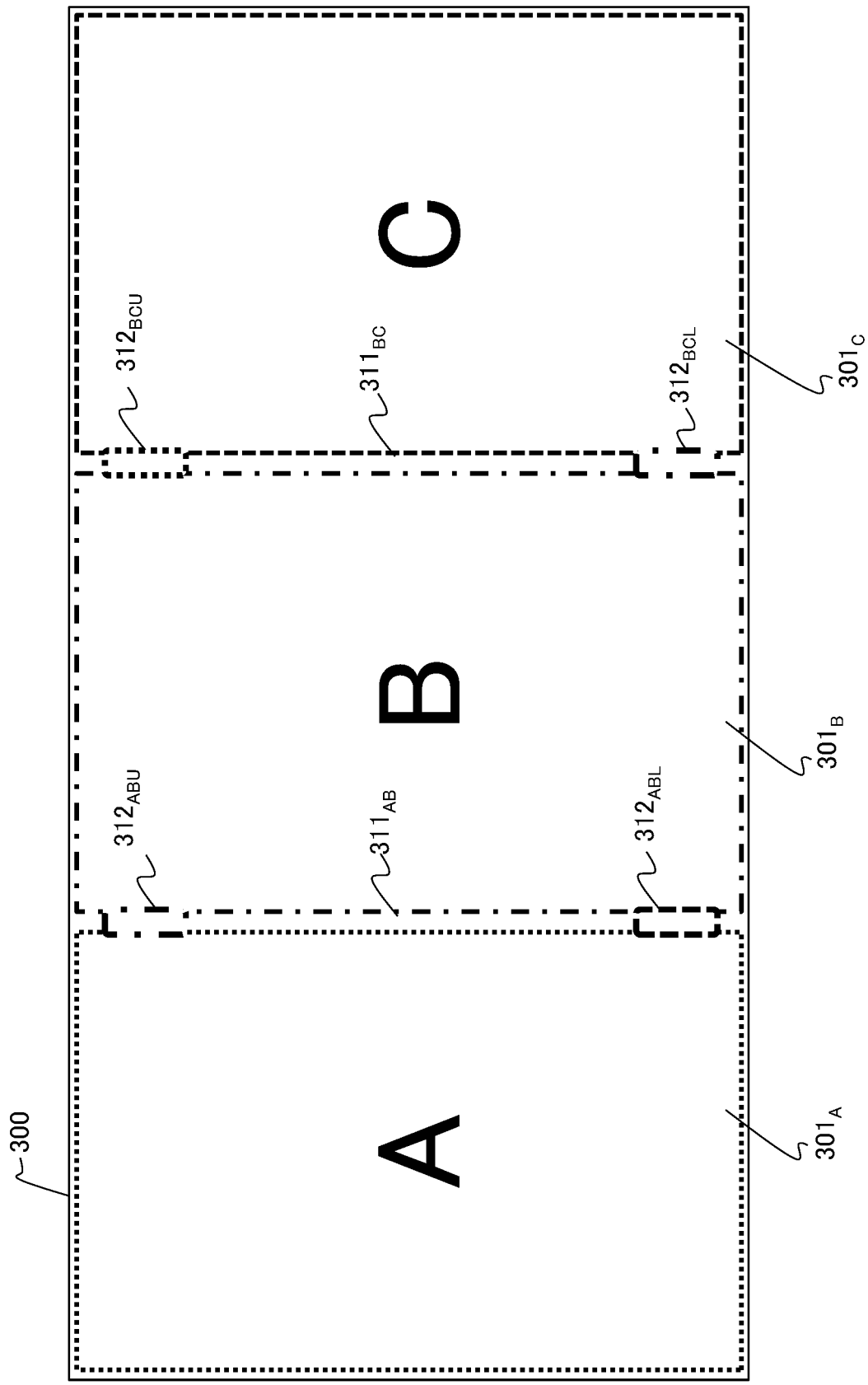
FIG. 12 is a diagram showing an example of a third display of a split screen.

FIG. 12 depicts a third display example of a split screen 300.

In the third display example, frame lines for an operable region 312 and frame lines for the split region 301 that correspond thereto are displayed with the same line type (which may be the same color) so as to make clear the correspondence relationships between the operable regions 312 in the second display example (FIG. 11) and the split regions 301 that will be reduced through the drag operation on the operable regions 312 toward the inside of the split screen 300 (the direction in which the two split regions 301 exist, in relation to the operable region 312). The colors or brightnesses of the corresponding operable regions 312 and split regions 301 may be matched, or shadows may be displayed instead. The display that indicates the correspondence relationships between the operable regions 312 and the split regions 301 may be displayed constantly, or instead may be displayed when the user begins and operation (which may be through a touch operation) on an operable region 312. When begun when the user operates the operable region 312, an emphasized display may be carried out through changing the frame color of the corresponding split region 301 without changing the display of the operable region 312, or by changing the brightness of the region as a whole, or the like.

In FIG. 3, the split region B is reduced if the user drags the operable region ABU toward the right, or drags the operable region BCL toward the left. Thus the frame lines for the operable regions ABU and BCL and the frame lines for the split region B are displayed with identical line types (dash-dot lines). Additionally, the split region C is reduced in size when the user drags the operable region ABL toward the right. Thus the frame lines of the operable region ABL and the frame lines of the split region C are displayed with the same line type (dashed lines). The split region A is reduced in size when the user drags the operable region BCU toward the left. Thus the frame lines of the operable region BCU and the frame lines of the split region A are displayed with the same line type (dotted lines).

In the case of the third display example, the relationship between the drag operation on the operable region 312 toward the inside of the screen and the split region 301 that will be reduced thereby is made clear, enabling an improvement in ease of operations for the user.

Note that even in regard to the first display example (FIG. 3), the same line type (which may be the same line color) may be displayed for the frame lines of the operable region 312 and the corresponding frame lines of the split regions 301, so as to make clear the relationship between the drag operation on the operable region 312 toward the inside of the screen and the split region 301 that will be reduced thereby, in the same manner as in the third display example.

In each of the displayed examples described above the explanations assume that the display unit 13 for the vehicle-mounted device 10 is installed in the landscape orientation, but the display unit 13 may instead be installed in the portrait orientation, and the split regions $301_A$, $301_B$, and $301_C$ may be lined up in a group in the vertical direction of the split screen 300. In this case, the descriptions of "toward the left," "toward the right," and "the horizontal direction" would instead be read as "upward," "downward," and "the vertical direction," respectively.

Each of the structures, functions, processing units, processing means, or the like, described above, may have some or all thereof achieved in hardware through, for example, designing as an integrated circuit. Each of the structures, functions, and the like, described above, may be achieved in the software through a processor interpreting and executing a program to achieve those functions. Information such as programs, evaluation tables, files, and the like, for achieving the individual functions may be placed in a memory, a storing device such as an HDD or SSD, or a recording medium such as an IC card, SD card, DVD, or the like. Control lines or data lines are noted when deemed necessary for the explanation, but not all control lines or data lines in the product are necessarily shown. In practice, substantially all of the structures can be thought of as being mutually connected.

The present invention is not only a data processing device, but rather may be provided in a variety of forms, such as a data processing method by a data processing device, a program that can be read by a computer, or the like.

EXPLANATION OF REFERENCE SYMBOLS

10: Vehicle-Mounted Device
11: Processing Unit
111: Operation Evaluating Unit
112: Function Executing Unit
113: Screen Generating Unit
12: Operation Receiving Unit
13: Display Unit

The invention claimed is:
1. A data processing device comprising: a processor, a memory and a storage, the processor comprising: a display circuit that displays various contents on a screen;
   an operation receiving circuit, that is layered on the display circuit and receives operation inputs from a user on the screen;
   an operation evaluating circuit that evaluates an operation by the operation inputs on the operation receiving circuit; and
   a screen generating circuit, wherein the screen generating circuit:
   generates a split screen, wherein the split screen includes a first split region, a second split region, and a third split region, lined up sequentially in a row, wherein the second split region is lined up between the first and third split regions;
   displays a first interactive boundary line between the first split region and the second split region, wherein:
      the first interactive boundary line includes a plurality of operable regions including a first operable region,
      the first operable region has an extent that is biased into the first split region compared to a remainder of the first interactive boundary line,
      the first operable region locks a size of the second split region and the plurality of operable regions includes a second operable region,
      the second operable region has an extent that is biased into the second split region compared to the remainder of the first interactive boundary line, and
      the second operable region locks a size of the third split region,
   in response to a first drag input including the user dragging a selected operable region of the plurality of operable regions of the first interactive boundary line towards the second split region:
      in response to determining that the selected operable region includes the extent that is biased into the first split region compared to the remainder of the first interactive boundary line:
         enlarges a size of the first split region,
         maintains the size of the second split region, and
         reduces a size of the third split region, and
      in response to determining that the selected operable region includes the extent that is biased into the second split region compared to the remainder of the first interactive boundary line;
         enlarges the size of the first split region,
         reduces the size of the second split region and
         maintains the size of the third split region.

2. The data processing device according to claim 1, wherein in response to the user dragging the first operable region of the first interactive boundary line towards the first split region, the screen generating circuit:
   reduces the size of the first split region,
   enlarges the size of the second split region, and maintains the size of the third split region.

3. The data processing device according to claim 1, wherein in response to the user dragging the first operable region of the first interactive boundary line towards the second split region the screen generating circuit:
   reduces the size of the first split region,
   maintains the size of the second split region and
   enlarges the size of the third split region.

4. The data processing device according to claim 1, wherein the screen generating circuit further:
   generates a second interactive boundary line between the second split region and the third split region, wherein the second interactive boundary line includes a third operable region and a fourth operable region,
   in response to the user dragging the third operable region of the second interactive boundary line towards the second split region:
      maintains a size of the first split region,
      reduces a size of the second split region and
      enlarges a size of the third split region; and
   in response to the user dragging the fourth operable region of the second interactive boundary line towards the second split region:
      reduces a size of the first split region,
      maintains a size of the second split region and
      enlarges a size of the third split region.

5. The data processing device according to claim 1, wherein:
   the screen generating circuit further:
   displays the split screen with appearances that shows which of the split regions will be reduced in response to the user dragging on each of operable region in a direction toward an inside of the split screen, distinguishable from the other split regions that will not be reduced.

6. A method for displaying information on a display to a user, the method comprising:
  generating a screen on the display, wherein the screen is split into a plurality of split regions including a first split region, a second split region and a third split region, arrayed sequentially in a row, wherein the second split region is lined up between the first and third split regions;
  displaying a first interactive boundary line between the first split region and the second split region, wherein:
    the first interactive boundary line includes a plurality of operable regions including a first operable region,
    the first operable region has an extent that is biased into the first split region compared to a remainder of the first interactive boundary line,
    the first operable region locks a size of the second split region and the plurality of operable regions includes a second operable region,
    the second operable region has an extent that is biased into the second split region compared to the remainder of the first interactive boundary line, and
    the second operable region locks a size of the third split region,
  detecting a first drag operation by the user, wherein the first drag operation includes the user dragging a selected operable region of the plurality of operable regions of the first interactive boundary line toward the second split region;
  in response to detecting that the selected operable region includes the extent that is biased into the first split region compared to the remainder of the first interactive boundary line:
    enlarging a size of the first split region,
    maintaining a size of the second split region and
    reducing a size of the third split region;
  in response to detecting that the selected operable region includes the extent that is biased into the second split region compared to the remainder of the first interactive boundary line:
    enlarging the size of the first split region,
    reducing the size of the second split region and
    maintaining the size of the third split region.

\* \* \* \* \*